United States Patent [19]

Link

[11] Patent Number: 5,060,832
[45] Date of Patent: Oct. 29, 1991

[54] WATER BOTTLE CAGE ASSEMBLY
[75] Inventor: Paul C. Link, Ft. Recovery, Ohio
[73] Assignee: Huffy Corporation, Dayton, Ohio
[21] Appl. No.: 508,326
[22] Filed: Apr. 11, 1990
[51] Int. Cl.⁵ .............................................. B62J 11/00
[52] U.S. Cl. .................................. 224/32 R; 224/39; 248/311.2
[58] Field of Search .................. 224/32 R, 35, 37, 38, 224/39, 41; 248/311.2, 230

[56] References Cited
U.S. PATENT DOCUMENTS

| | | | |
|---|---|---|---|
| 1,875,813 | 9/1932 | Kaplan et al. | 248/230 |
| 3,033,404 | 5/1962 | Adell | 248/311.2 |
| 3,033,405 | 5/1962 | Adell | 248/311.2 |
| 3,794,285 | 2/1974 | Barts | 248/311.2 |
| 4,009,810 | 3/1977 | Shook | 224/39 |
| 4,315,583 | 2/1982 | Hine, Jr. | 224/41 |
| 4,339,060 | 7/1982 | Braida, Jr. | 224/32 |
| 4,386,721 | 6/1983 | Shimano | 224/39 |
| 4,437,596 | 3/1984 | Shook | 224/39 |
| 4,441,638 | 4/1984 | Shimano | 224/35 |
| 4,883,205 | 11/1989 | Saelens et al. | 224/39 |

FOREIGN PATENT DOCUMENTS 618040  3/1927  France ............................ 224/30 R Primary Examiner—Renee S. Luebke
Attorney, Agent, or Firm—Thompson, Hine and Flory

[57] ABSTRACT

A water bottle cage assembly having a mounting bracket for releasable attachment to a bicycle frame tube. The cage assembly is shaped to receive a flexible, resilient water bottle in a releasable interference fit and includes an inboard segment having a pair of substantially parallel, longitudinally-extending struts, each strut having an offset portion extending outwardly from the cage, which is received by the mounting bracket in a pair of unitary recesses. The bracket preferably includes a pair of flexible straps positioned opposite to each other and joined by nut and bolt combinations at their ends to clamp the frame tube therebetween. At least one strap member includes the recesses which receive the offset portions such that they are clamped against the frame tube. The offset portions space the cage from the frame tube and provide clearance between the water bottle and the mounting bracket.

10 Claims, 1 Drawing Sheet

WATER BOTTLE CAGE ASSEMBLY

BACKGROUND OF THE INVENTION

The present invention relates to accessories mountable on the frame of a bicycle and, more particularly, to water bottle cages attachable to a frame tube of a bicycle.

A common accessory for a bicycle, especially bicycles designed for training or long distance riding, is the water bottle. Typically, the water bottle is a flexible plastic flask with a removable cap carried in a cage comprising a bent wire shaped to receive the water bottle in an interference fit. The cage is attached to a bicycle frame tube by a mounting bracket.

Some water bottle cage assemblies are attached to a frame tube by screws which pass through a plate portion of the mounting bracket and are tapped into the frame tube itself. Such cage assemblies are disclosed in Shimano U.S. Pat. No. 4,386,721 and Shook U.S. Pat. No. 4,437,596. However, in some applications it is undesirable to utilize a cage assembly having screws that tap directly into the frame tube itself. Such cage assemblies are not desirable as after-market products, typically are fixed at a single, predetermined location on the frame, and of necessity require the penetration of the protective paint coating of the frame.

Accordingly, it is desirable in some applications to provide a water bottle cage assembly which is attachable to a bicycle frame tube without penetration of the tube itself by screws or other fastening means. An example of such a device is disclosed in Shook U.S. Pat. No. 4,009,810. That patent discloses a cage assembly made of a single piece of bent wire having a pair of substantially parallel, inboard struts secured to the frame tube by a pair of annular straps. Each annular strap is pinched about the frame tube by a barrel nut and bolt unit. This device also includes a plastic tube or sleeve which fits about the inboard struts of the cage and through which the straps extend. This sleeve acts in part to space the frame from the tube and forms a non-abrasive connection therebetween.

SUMMARY OF THE INVENTION

The present invention is a water bottle cage assembly which simplifies the cage and mounting bracket design, yet provides a secure connection between the water bottle, cage and frame tube. The cage assembly includes a cage shaped to receive a water bottle in a releasable, interference fit and includes an inboard segment having a pair of substantially parallel, longitudinally-extending struts, each having an offset portion extending outwardly from the cage. The invention also includes a bracket for mounting the cage on a frame tube at the offset portions and includes a pair of flexible strap members oriented in opposing relation on opposite sides of a frame tube. The strap members are joined at their ends by nut and bolt combinations so that they may be clamped against frame tubes of a wide variety of diameters.

Each strap member includes a pair of transverse recesses shaped to receive the offset portions so that, when clamped against a tube, a selected one of the strap members clamps the offset portions against the tube. The strap members may be of identical construction which further reduces the number of different parts required for the assembly. Such duplication of parts also facilitates the attachment of the assembly on the frame.

Accordingly, it is an object of the present invention to provide a water bottle cage assembly which is relatively simple to construct and mount a water bottle cage on the frame tube of a bicycle; a cage assembly which has a minimum of different parts which facilitate assembly; and a cage assembly in which the cage is attached to the frame tube of a bicycle without attachment means that penetrate the frame tube itself.

Other objects and advantages of the present invention will be apparent from the following description, the accompanying drawings and the appended claims.

DETAILED DESCRIPTION

Figure 1:
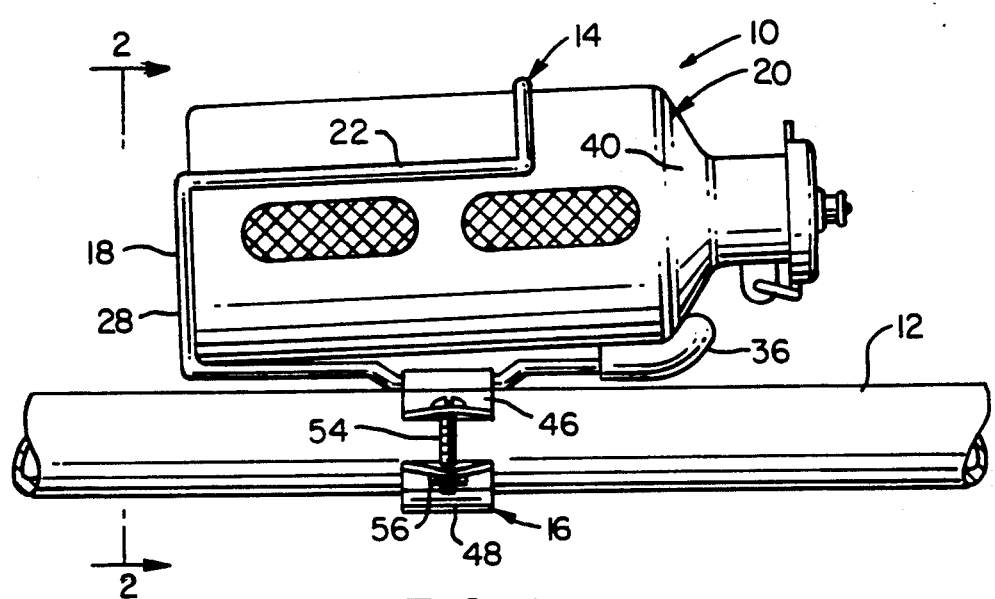
FIG. 1 is a side elevation of the water bottle cage assembly of the present invention, mounted on a section of a bicycle frame tube.

As shown in FIG. 1, the water bottle cage assembly of the present invention, generally designated 10, is designed to be mounted on the frame tube 12 of a bicycle. Although it is envisioned that the frame tube 12 would be the down tube of the bicycle frame, the seat tube or top tube of a typical bicycle frame would be equally appropriate.

The cage assembly 10 includes a cage 14 and mounting bracket 16. The cage 14 is made of a single piece of wire 18 which is shaped to receive a water bottle 20 in an interference fit. The water bottle 20 preferably is made of a resilient material such as a plastic so that it readily deforms into the cage 14.

Figure 3:
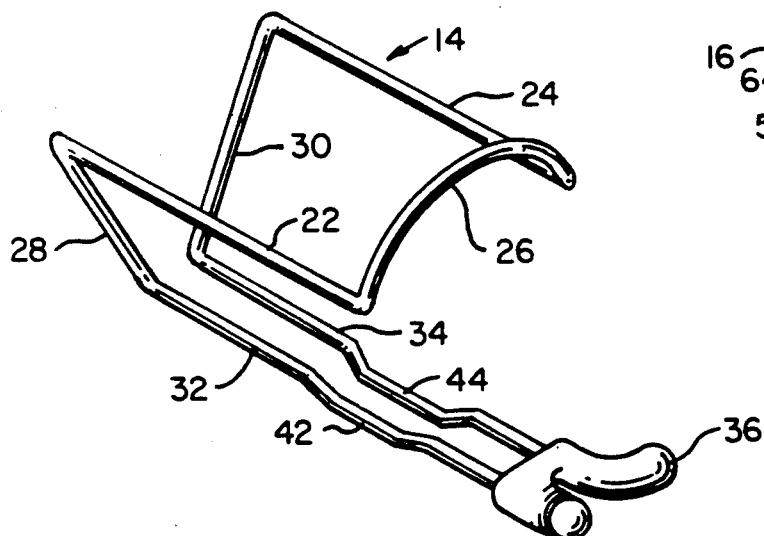
FIG. 3 is a perspective view of the water bottle cage of FIG. 1.

As shown best in FIG. 3, the wire 18 of cage 14 is bent to form a parallel outboard struts 22, 24 joined by an arcuate transverse strut 26 which approximates a sector of the bottle 20 diameter. The outboard struts 22, 24 continue to form a pair of skewed bottom struts 28, 30 which then progressed to form a pair of substantially parallel inboard struts 32, 34. The inboard struts 32, 34 terminate and are held in position by a plastic end cap 36.

As shown in FIG. 1, a water bottle is constrained within the cage 14 by the outboard struts 22, 24 on one longitudinal side (only strut 22 is visible), the inboard struts 32, 34 on an opposite side (only strut 32 is visible), the bottom struts 28, 30 at one end (only strut 28 is visible) and the end cap 36 at the opposite end. The bottle 20 is inserted and removed from the cage by slightly deflecting the outboard struts 22, 24 and transverse strut 26 away from the inboard struts 32, 34 and end cap 36. The end cap 36 curves around to engage the frustoconical upper portion 40 of the bottle 20 to retain it within the cage 14 when inserted.

The inboard struts 32, 34 each include offset portions 42, 44 which extend outwardly from the cage 14. Offset portions 42, 44 are spaced adjacent to each other along the lengths of the inboard struts 32, 34 and approximately midway along the struts.

Mounting bracket 16 includes a pair of strap members 46, 48 and a pair of nut and bolt combinations 50, 52 and 54, 56. Strap members 46, 48 each include a pair of transverse recesses 58, 60 spaced apart the same distance as the offset portions 42, 44. The strap members preferably are made of flexible metal. The strap members each include an arcuate segment 62, which includes the transverse recesses 58, 60 and a pair of flanges 64, 66 extending at angles to the ends of the arcuate segment. Each of the flanges 64, 66 includes holes (not shown) through which one of the bolts 50, 54 extends.

Figure 2:
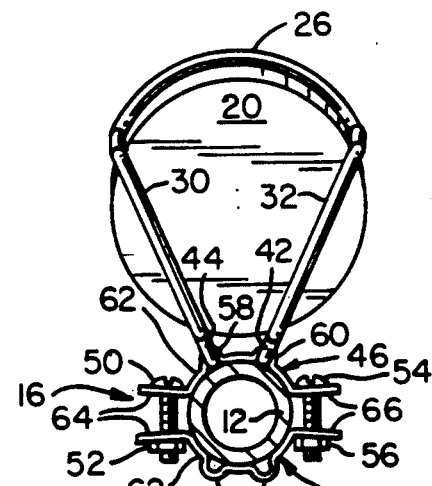
FIG. 2 is an end elevation taken at line 2—2 of FIG. 1.

As shown in FIGS. 1 and 2, the cage assembly 10 is mounted on a frame tube 12 by placing one of the strap members 46, 48 (strap member 46 is selected in the drawing figures) such that the offset portions 42, 44 are received within its transverse recesses 58, 60. The strap member 46 is then placed against the frame tube 12 and the other strap member 48 is placed directly opposite on the frame tube. Nut and bolt combinations 50, 52 and 54, 56 are attached to the flanges 64, 66 of the strap members 46, 48 and tightened until the strap members clamp against the frame tube 12 sufficiently to prevent sliding movement relative to the frame tube.

This same clamping action clamps the offset portions 42, 44 against the frame tube 12 sufficiently to prevent sliding movement of the cage 14 relative to the mounting bracket 16 or frame tube 12. It should be noted that, when mounted on the frame tube 12 as shown in FIG. 1, the offset portions space the cage away from the frame tube to provide a single area of contact (or at most a double area of contact with the end cap 36) and the offset portions serve to displace the mounting bracket 16 away from the water bottle to prevent interference with the insertion or removal of the water bottle from the cage and further to prevent scoring of the water bottle surface by the metal of the strap member 46.

As shown in FIG. 2, the strap members preferably are sized to approximate a sector of the circumference of the largest frame tube likely to be encountered. Smaller frame tubes can be utilized simply by tightening the nut and bolt combinations 50–56 sufficiently to clamp the strap members 46, 48 against them. Consequently, the mounting bracket 16 can accommodate virtually any diameter frame tube. Further, by providing strap members 46, 48 which are of identical construction, it is virtually impossible to attach the bracket 16 to the cage 14 incorrectly. Further, a mounting bracket is provided which comprises but three different parts: strap members 46, 48 and nut and bolt combinations 50–56.

While the form of apparatus herein described constitutes a preferred embodiment of the invention, it is to be understood that the invention is not limited to this precise form of apparatus, and that changes may be made therein without departing from the scope of the invention.

What is claimed is:

1. For use with a water bottle of a type having a flexible body, a cage assembly for mounting said water bottle to a bicycle frame tube comprising:
   a cage shaped to receive said water bottle in a releasable interference fit and including an inboard segment having a pair of substantially parallel, longitudinally-extending struts, each of said struts having an offset portion extending outwardly from said cage; and
   bracket means for mounting said cage on said frame tube at said offset portions and including recess means for receiving said offset portions therein, said bracket means clamping said offset portions against said frame tube.

2. The cage assembly of claim 1 wherein said bracket means is adjustable to accommodate a variety of frame tube diameters.

3. The cage assembly of claim 2 wherein said bracket means includes first and second strap members, at least one of said strap members having said recess means.

4. The cage assembly of claim 3 wherein said strap members are oriented in opposing relation to receive said frame tube therebetween and to lie on opposite sides thereof.

5. The cage assembly of claim 4 wherein said bracket means includes connecting members extending between opposing ends of said strap members, said connecting members being adjustable whereby a spacing between said strap members may be varied to clamp said strap members against frame tubes of a variety of diameters.

6. The cage assembly of claim 5 wherein said first and second strap members are identical to each other in construction.

7. The cage assembly of claim 6 wherein said connecting members each comprise nut and bolt combinations.

8. The cage assembly of claim 1 wherein said bracket means includes a first strap member and said recess means includes a pair of grooves formed in said strap member and shaped to receive said offset portions therein.

9. The cage assembly of claim 8 wherein said bracket means includes a second strap member oriented in opposing relation to said first strap member to receive said frame tube therebetween and to lie on opposite sides thereof; and
   a pair of connecting members extending between opposing ends of said strap members, said strap members being adjustable whereby a spacing between said strap members may be varied to clamp said strap members against frame tubes of a variety of diameters.

10. For use with a water bottle of a type having a flexible body, a cage assembly for mounting said water bottle to a bicycle frame tube comprising:
    a cage shaped to receive said water bottle in a releasable interference fit and including an inboard segment having a pair of substantially parallel, longitudinally-extending struts, each of said struts having an offset portion extending outwardly from said cage;
    a first flexible strap member shaped to extend partially about said frame tube and having a pair of unitary recesses, opening inwardy to said frame tube, shaped to receive said struts therein;
    a second flexible strap member shaped to extend partially about said frame tube and oriented in opposing relation to said first strap member to receive said frame tube therebetween and to lie on opposite sides thereof; and
    a pair of adjustable connecting members extending between opposing ends of said strap members whereby said strap members are clamped against said frame tube and said struts are clamped by said first strap member against said frame tube.

* * * * *